United States Patent [19]

Nakamura et al.

[11] Patent Number: 5,586,336
[45] Date of Patent: Dec. 17, 1996

[54] MICROCOMPUTER CAPABLE OF MONITORING INTERNAL RESOURCES FROM EXTERNAL

[75] Inventors: Kimiko Nakamura; Hajime Sakuma, both of Tokyo, Japan

[73] Assignee: NEC Corporation, Tokyo, Japan

[21] Appl. No.: 597,688

[22] Filed: Feb. 6, 1996

Related U.S. Application Data

[63] Continuation of Ser. No. 70,093, May 28, 1993, abandoned.

[30] Foreign Application Priority Data

May 28, 1992 [JP] Japan .................................. 4-137275

[51] Int. Cl.⁶ .................................................. G06F 11/34
[52] U.S. Cl. ........................................ 395/568; 371/22.1
[58] Field of Search .................................. 395/275, 775, 395/325, 735, 225; 371/16.1

[56] References Cited

U.S. PATENT DOCUMENTS

| | | | |
|---|---|---|---|
| 4,482,953 | 11/1984 | Burke | 395/325 |
| 4,956,805 | 9/1990 | Biffle et al. | 364/900 |
| 4,995,037 | 2/1991 | Imada et al. | 371/16.1 |
| 5,053,949 | 10/1991 | Allison et al. | 364/200 |
| 5,313,583 | 5/1994 | Yokota et al. | 395/275 |

*Primary Examiner*—Jack B. Harvey
*Assistant Examiner*—David A. Wiley
*Attorney, Agent, or Firm*—Whitham, Curtis, Whitham & McGinn

[57] ABSTRACT

A microcomputer includes an internal register previously written with an address from an external of the microcomputer. When the address becomes coincident with a register address outputted on an internal register address bus, data on an internal data bus is fetched to a holding register. A content of the holding register is outputted through a serial interface to the external of the microcomputer. Therefore, it is possible to obtain information of an internal resource of the microcomputer which would otherwise not be outputted from the external of the microcomputer, without stopping the execution of the microcomputer even temporarily. Accordingly, a machine controlled by the microcomputer will not run uncontrollably or break down. Furthermore, since the microcomputer is not stopped, it is possible to develop real time information of the actual application.

24 Claims, 8 Drawing Sheets

MICROCOMPUTER CAPABLE OF MONITORING INTERNAL RESOURCES FROM EXTERNAL

This is a continuation of application Ser. No. 08/070,093, filed on May 28, 1993, now abandoned.

BACKGROUND OF THE INVENTION

1. Field of the Invention

The present invention relates to a microcomputer, and more specifically to a microcomputer having the function of monitoring the internal resource of the microcomputer from an external of the microcomputer.

2. Description of Related Art

In conventional microcomputers, when a register-register operation instruction is executed, an address of a target register within a register group is generated by a register address generation circuit on the basis of register designation information stored in an instruction register, and then, supplied to a register address bus, so that the content of the target register is read out. A predetermined operation is performed on the read-out content by an ALU (arithmetic logic unit). Thereafter, the content processed by the ALU is written back to a designated register within the register group through an internal data bus.

On the other hand, in the case of an instruction for transferring data from a memory to an internal register, a memory address is generated on the basis of memory address information stored in the instruction register, and the generated memory address is supplied through the internal data bus and stored in an address buffer. This address is outputted through an external address bus to an external memory. Data read out from the external memory is supplied through an external data bus to the microcomputer, and stored in a data buffer of the microcomputer.

Thereafter, in order to write the data into the internal register, an address of a target register within the register group is generated by the register address generation circuit on the basis of register designation information stored in the instruction register, and supplied to the register address bus. At the same time, the content of the data buffer is written through the internal data bus to a register designated by the generated address.

In the two typical operations of the microcomputer as mentioned above, attention should be attracted to whether or not the data to be processed in the course of execution of the instruction is outputted to the external of the microcomputer. In the case of transferring data between the memory and the internal register of the microcomputer, the address of the memory is outputted onto the external address bus, and the content of the memory is outputted onto the external data bus. Therefore, by monitoring the external address bus and the external data bus (and also, a read or write strobe signal in ordinary cases) in the external of the microcomputer, it is possible to detect the address and the data without distributing the operation of the microcomputer, and therefore, it is possible to sense the execution condition of the microcomputer from the external of the microcomputer.

However, in the case of the register-register operation, information appears only in the internal data bus and the register address bus of the microcomputer, and therefore, it is impossible to know what processing is performed in the microcomputer, from the external of the microcomputer.

In addition, in the case of handling the content of a RAM (random access memory) of the microcomputer, a processing performed in the microcomputer is outputted to the external of the microcomputer, similarly to the register-register operation as mentioned above. Therefore, in the case of handling an internal resource completely confined within the inside of the microcomputer, information is never outputted to the external of the microcomputer.

On the other hand, in developing a program for the microcomputer, it is often necessary to refer to the information of the confined internal resource. In order to satisfy this request, it is a conventional practice to temporarily stop the execution of the microcomputer, and to cause the microcomputer to execute an instruction for outputting information of an internal resource to an external, so that the information of the internal resource can be obtained in the external of the microcomputer.

However, in such an application in which a machine is controlled by use of the microcomputer, if the execution of the microcomputer is temporarily stopped, there is possibility that the machine runs uncontrollably or is broken down. In addition, if the execution of the microcomputer is temporarily stopped, the execution time of the program at the time of developing the program becomes different from the execution time of the program when the program is actually executed in the application, and therefore, it becomes impossible to develop the program under the actual time condition. For this application, the program development is very difficult, since there is no means for obtain the information of the internal resource completely confined within the inside of the microcomputer.

SUMMARY OF THE INVENTION

Accordingly, it is an object of the present invention to provide a microcomputer which has overcome the above mentioned defect of the conventional one.

Another object of the present invention is to provide a microcomputer capable of monitoring an internal resource confined within the inside of the microcomputer, from an external of the microcomputer, and without disturbing the execution of the microcomputer.

The above and other objects of the present invention are achieved in accordance with the present invention by a microcomputer which includes a central processing unit and a plurality of registers all of which are integrated on a single semiconductor substrate, the microcomputer comprising:

at least one holding means provided for internal resources whose content is not outputted to an external of the microcomputer, the at least one holding means operating to fetch the content of a predetermined internal resource at a predetermined timing;

output means for outputting the content of the at least one holding means to the external of the microcomputer at another predetermined timing;

whereby the content of the at least one holding means is outputted through the output means to the external of the microcomputer without disturbing the execution of an inherent operation of the microcomputer.

In a preferred embodiment of the microcomputer, the at least one holding means includes a plurality of holding means, and further including a means for discriminating the plurality of holding means. In addition, the output means is includes a serial interface.

In the case that the internal resource includes at least one internal register, the microcomputer further includes at least one register address setting means previously set with an address of the at least one internal register, and at least one comparator for comparing a register address set in the at least one register address setting means with a register address outputted on an internal address bus of the microcomputer for accessing the at least one internal register. The at least one holding means fetches data on an internal data bus of the microcomputer in response to a coincidence output of the at least one computer.

If the output means includes a serial interface, the microcomputer is operated in such a manner that, after only a predetermined number of contents of the at least one holding means are outputted through the serial interface to the external of the microcomputer, the serial interface is switched into an input mode, and data for discriminating the internal resources is inputted to the microcomputer through the serial interface from the external of the microcomputer.

Alternatively, if the output means includes a serial interface, the microcomputer is operated in such a manner that, after only a predetermined number of contents of the at least one holding means are outputted through the serial interface to the external of the microcomputer, the serial interface is switched into an input mode, and a register address to be set to the register setting means is inputted to the microcomputer through the serial interface from the external of the microcomputer.

With the above mentioned arrangement, the address of the internal resource (internal register) is previously set from an external of the microcomputer. When the address of the internal resource becomes coincident with a register address outputted on an internal register address bus, data on an internal data bus is held in the holding means. A content of the internal register is outputted to the external of the microcomputer through the output means (for example, the serial interface). Therefore, it is possible to obtain information of the internal resource confined within the inside of the microcomputer without disturbing the operation of the microcomputer.

The above and other objects, features and advantages of the present invention will be apparent from the following description of preferred embodiments of the invention with reference to the accompanying drawings.

DESCRIPTION OF THE PREFERRED EMBODIMENTS

Figure 1:
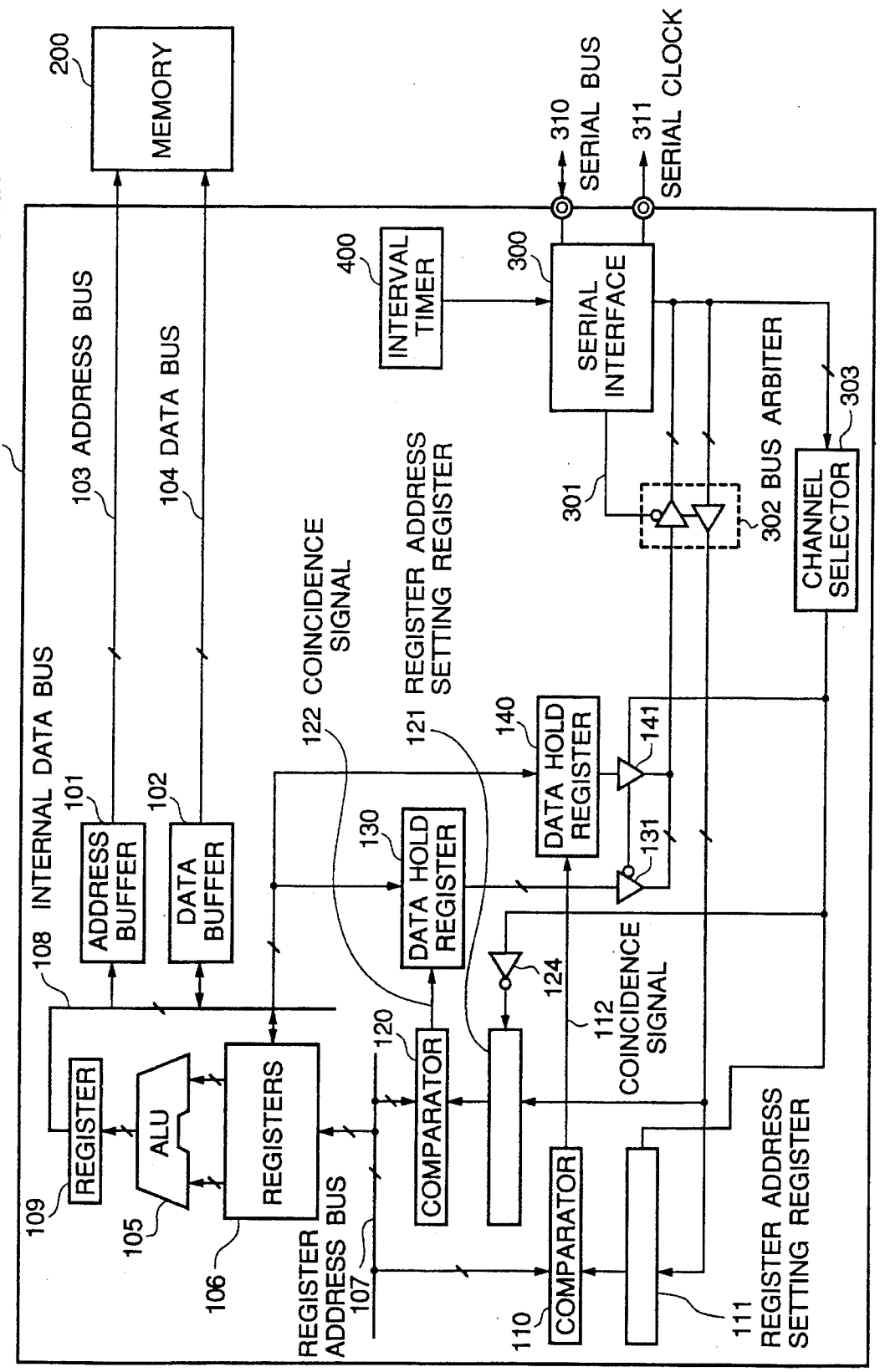
FIG. 1 is a block diagram of a first embodiment of the microcomputer in accordance with the present invention.

Referring to FIG. 1, there is shown a block diagram of a first embodiment of the microcomputer in accordance with the present invention.

As shown in FIG. 1, a microcomputer is generally designated by Reference Numeral 100, and is coupled to an external memory 200 through an external address bus 103 and an external data bus 104. The microcomputer 100 internally includes an ALU (arithmetic logic unit) 105, a register group 106, an address buffer 101, and a data buffer 102, which are coupled by an internal data bus 108, a register address bus 107 and others as shown. Namely, the address buffer 101 and the data buffer 102 are connected to the external address bus 103 and the external data bus 104, respectively, and also connected to the internal data bus 108, which is in turn connected to the register group 106 and also an output register 109 coupled to an output of the ALU 105. A pair of inputs of the ALU 105 are connected to the register group 106, which is connected to the register address bus 107.

Furthermore, the microcomputer 100 internally includes a temporary register, an instruction register, a register address generating circuit, a microprogram ROM (read only memory), peripheral circuits, various decoders, and also a ROM and a RAM (random access memory) in some cases, which are not shown in the drawing for simplification of the drawing and the description.

The microcomputer 100 also includes comparators 110 and 120, register address setting registers 111 and 121, data hold registers 130 and 140, an interval timer 400, a serial interface 300, a bus arbiter 302, a channel selector 303, as connected as shown. The serial interface 300 is connected through a serial bus 310 to an external of the microcomputer 100, and outputs a serial clock 311 to the external of the microcomputer 100. In brief, the interval timer 400 outputs a start request at predetermined intervals to the serial interface 300. The serial interface 300 outputs a bus switchover signal 301 to the bus arbiter 302, and coupled to the bus arbiter 302 is the channel selector 303. This channel selector 303 outputs a channel section signal as a control signal to the register address setting register 111. This channel section signal is also supplied through an inverter 124 to the register address setting register 121 as a control signal. Furthermore, the channel section signal is supplied to a non-inverted control input of a tristate buffer 131 and an inverted control input of a tristate buffer 141.

The data hold registers 130 and 140 are connected to the internal data bus 108, and an output of the data hold register 130 is connected to an input of the tristate buffer 131, whose output is connected to the bus arbiter 302. An output of the data hold register 140 is connected to an input of the tristate buffer 141, whose output is connected to the bus arbiter 302. The data hold registers 130 and 140 are controlled by a coincidence signal 122 and 112 outputted from the comparators 120 and 110, respectively.

The comparators 110 and 120 are connected at their one input to the register address bus 107, and at their other input to an output of the register address setting registers 111 and 121, respectively. These register address setting registers 111 and 121 have their input connected to the bus arbiter 302.

In the following description, the comparator 110, the register address setting register 111 and the data hold register 140 are handled as one group, and called "CHANNEL 0". In addition, the comparator 120, the register address setting register 121 and the data hold register 130 are handled as another group, and called "CHANNEL 1"

Figure 2:
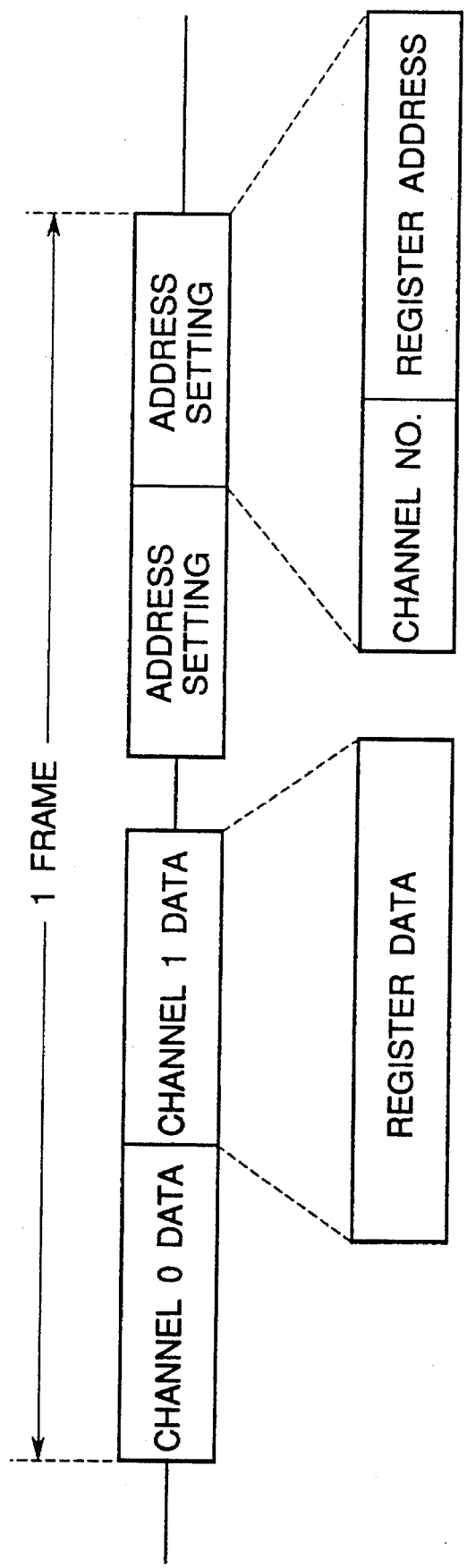
FIG. 2 illustrates a protocol of the serial interface in the first embodiment shown in FIG. 1.

The serial interface 300 is configured to receive a start request from the interval timer 400 at predetermined intervals, and to execute an input/output operation of series of serial data through the serial bus 310 in synchronism with the serial clock. A unit which is serially transmitted or received with each one start request, is called one frame. The structure of one frame is shown in FIG. 2.

One frame becomes an output mode in its first half, and an input mode in its second half. The serial interface 300 outputs data of "CHANNEL 0" and "CHANNEL 1" in the first half of one frame. The data of the channel is a content of the data hold register 140 in the case of "CHANNEL 0", and a content of the data hold register 130 in the case of "CHANNEL 1".

After the data of both the channels has been outputted, the serial interface is brought into the input mode. In this second half of the one frame, new address setting information is supplied from the external of the microcomputer 100. The address setting information is constituted of the channel number and the register address. Since this embodiment has only "CHANNEL 0" and "CHANNEL 1", the channel number is assigned with "0" for "CHANNEL 0" and "1" for "CHANNEL 1", respectively. The register address is an address corresponding to only one register to be monitored of a plurality of internal registers of the microcomputer.

In the data transmission and reception under the protocol mentioned above, at a first start request from the interval timer 400, since the register addresses have not yet set from the external of the microcomputer, the data outputted to the external of the microcomputer is a dummy data.

In the serial interface 300 which has received the address setting information, since the information first received is the channel information, the information is transferred to the channel selector 303. For example, if the "CHANNEL 0" is designated, the channel selector selects the register address setting register 111. When the register address is succeedingly received, the serial interface 300 activates a bus switchover signal 301 so as to cause the bus arbiter 302 to connect the data bus from the serial interface 300 to the register address setting register, In this case, since the "CHANNEL 0" is designated, and therefore, since the register address setting register 111 is selected, the register address is stored in the register address setting register 111.

Similarly, if the "CHANNEL 1" is designated, the register address setting register 121 is selected, and the register address is stored in the register address setting register 121.

In the operation of the microcomputer 100, each time the internal register group 106 is accessed, an address for a target register within the internal register group 106 is outputted onto the register address bus 107. The comparator 110 constantly compares the content of the register address setting register 111 with the register address outputted on the register address bus 107, and when coincidence is obtained, the comparator 110 outputs an active coincidence signal 112 to the data hold register 140. When the register address is outputted on the register address bus 107, since a write data is outputted onto the internal data bus 108 in the case of writing the data into the register, the data on the internal data bus 108 is fetched into the data hold register 140 in time with the active coincidence signal 112.

Similarly, if the "CHANNEL 1" is designated, the data on the internal data bus 108 is fetched into the data hold register 130 in time with an active coincidence signal 122.

When the serial interface 300 is triggered in response to the signal from the interval timer 400, the serial interface 300 makes the bus switchover signal 301, inactive, so that the data hold registers 130 and 140 (actually, the output of the tristate buffers 131 and 141) are coupled to the serial interface 300 through the bus arbiter 302.

Thereafter, the tristate buffer 141 is activated by the channel selector 303 and the tristate buffer 131 is inactivated by the channel selector 303, so that the register data for the "CHANNEL 0" is read out from the data hold register 140. Thus, the register data is outputted through the serial bus 310 to the external of the microcomputer 100 in synchronism with the serial clock 311. Succeedingly, the tristate buffer 141 is inactivated by the channel selector 303 and the tristate buffer 131 is activated by the channel selector 303, so that the register data for the "CHANNEL 1" is read out from the data hold register 130, is outputted through the serial bus 310 to the external of the microcomputer 100 in synchronism with the serial clock 311.

After the outputting of the register data for the "CHANNEL 0" and the "CHANNEL 1" has been completed, the serial bus 310 is changed over to the input mode by the serial interface 300, so that the serial interface 300 waits the register address setting from the external of the microcomputer. In the following, the register address setting is performed in the protocol mentioned hereinbefore.

In the first embodiment mentioned just above, there are only the two channels of "CHANNEL 0" and "CHANNEL 1". However, it would be apparent to averaged persons skilled in the art that the number of channels can be easily increased by modifying the channel selector and adding necessary hardware.

Figure 3:
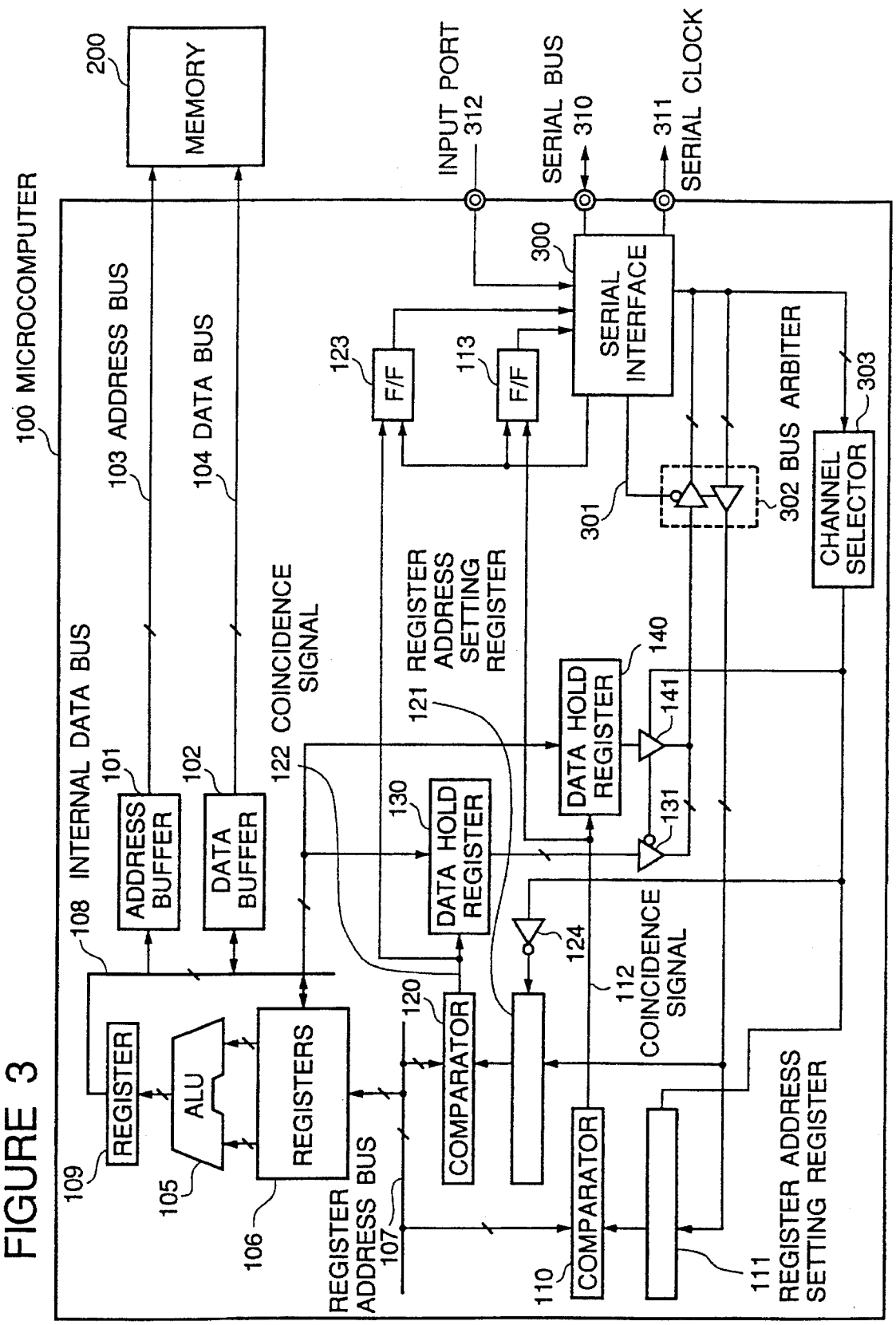
FIG. 3 is a block diagram of a second embodiment of the microcomputer in accordance with the present invention.

Referring to FIG. 3, there is shown a block diagram of a second embodiment of the microcomputer in accordance with the present invention. In FIG. 3, elements similar to those shown in FIG. 1 are given the same Reference Numerals, and explanation thereof will be omitted.

As will be seen from comparison between FIGS. 1 and 3, the second embodiment includes, in place of the interval time 400 of the first embodiment, a start request flipflop 113 set by the coincidence signal 112 and a start request flipflop 123 set by the coincidence signal 122. The second embodiment also includes an input port 312 through the trigger of the serial interface 300 is requested from the external of the microcomputer 100.

Figure 4:
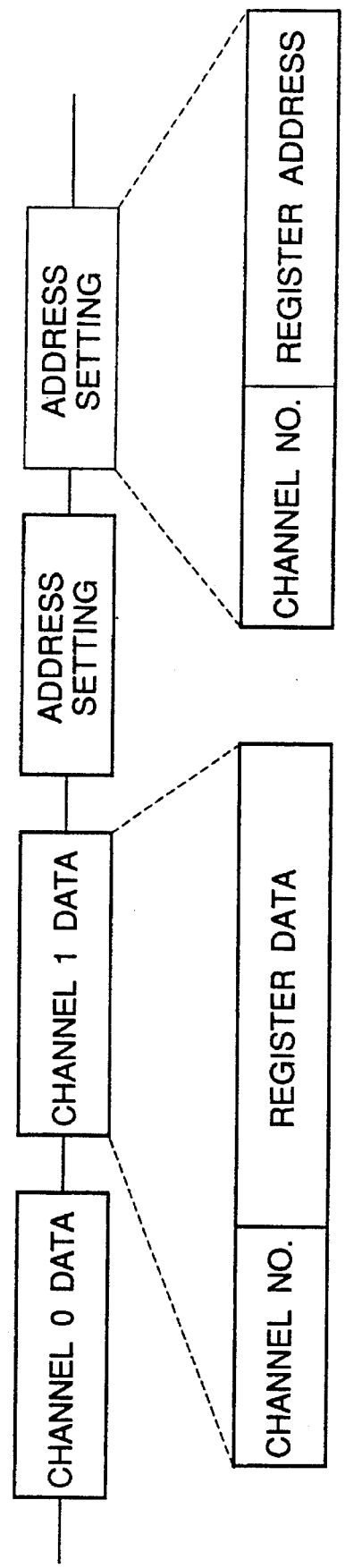
FIG. 4 illustrates a protocol of the serial interface in the second embodiment shown in FIG. 3.

The serial interface 300 of the second embodiment receives a start request of the serial data output from the start request flipflops 113 and 123, and outputs a series of serial data through the serial bus 310 in synchronism with the serial clock 311. A protocol of the serial interface in this second embodiment is shown in FIG. 4.

The second embodiment has a conception of the frame that is different from the first embodiment. When the serial interface 300 is triggered by the start request flipflops 113 and 123, the serial interface 300 operates in the output mode, and when the serial interface 300 is triggered through the input port 312, the serial interface 300 operates in the input mode.

In the output mode, the channel data is composed of discrimination data indicative of the "CHANNEL 0" and the data hold register 140 if the "CHANNEL 0" is designated, and discrimination data indicative of the "CHANNEL 1" and the data hold register 130 if the "CHANNEL 1" is designated.

When the start request of the input mode is given through the input port 312 to the serial interface 300, a new address setting information is inputted from the external of the microcomputer 100. Similarly to the first embodiment, the address setting information is composed of the channel number and the register address.

The operation of the serial interface 300 when it has received the address setting information is the same as that of the first embodiment, therefore, explanation thereof will be omitted.

In addition, the fetching of the register data into the data hold registers 130 and 140 in the course of the operation of the microcomputer 100 is the same as that of the first embodiment, therefore, explanation thereof will be omitted.

When the serial interface 300 is started to operate in response to the start request flipflop 113 and 123 set at the timing where the coincidence signals 112 and 122 are outputted, the serial interface 300 inactivates the bus switchover signal 301 so that the data hold registers 130 and 140 (actually, the output of the tristate buffers 131 and 141) are coupled to the serial interface 300 through the bus arbiter 302.

Thereafter, if the start request flipflop 113 is active, the tristate buffers 141 and 131 are activated and inactivated by the channel selector 303, respectively, so that the register data for the "CHANNEL 0" is read out from the data hold register 140, and then, outputted through the serial bus 310 to the external of the microcomputer 100 in synchronism with the serial clock 311. When the outputting of the data is completed, the start request flipflop 113 is reset.

If the start request flipflop 123 is active, the tristate buffers 141 and 131 are inactivated and activated by the channel selector 303, respectively, so that the register data for the "CHANNEL 1" is read out from the data hold register 130, is outputted through the serial bus 310 to the external of the microcomputer 100 in synchronism with the serial block 311. When the outputting of the data is completed, the start request flipflop 123 is reset.

In the above mentioned embodiments, the register 106 is an internal resource of the microcomputer and the serial interface 300 is an input/output interface. However, the present invention can be seen similarly in the case that the internal resource is composed of the RAM, the ROM or the peripheral hardwares, and the input/output interface is formed of a parallel interface. In addition, in the above mentioned embodiments, the serial interface is of the clock synchronous type. However, it is possible to realize the serial interface under a different protocol such as a UART format.

Figure 5:
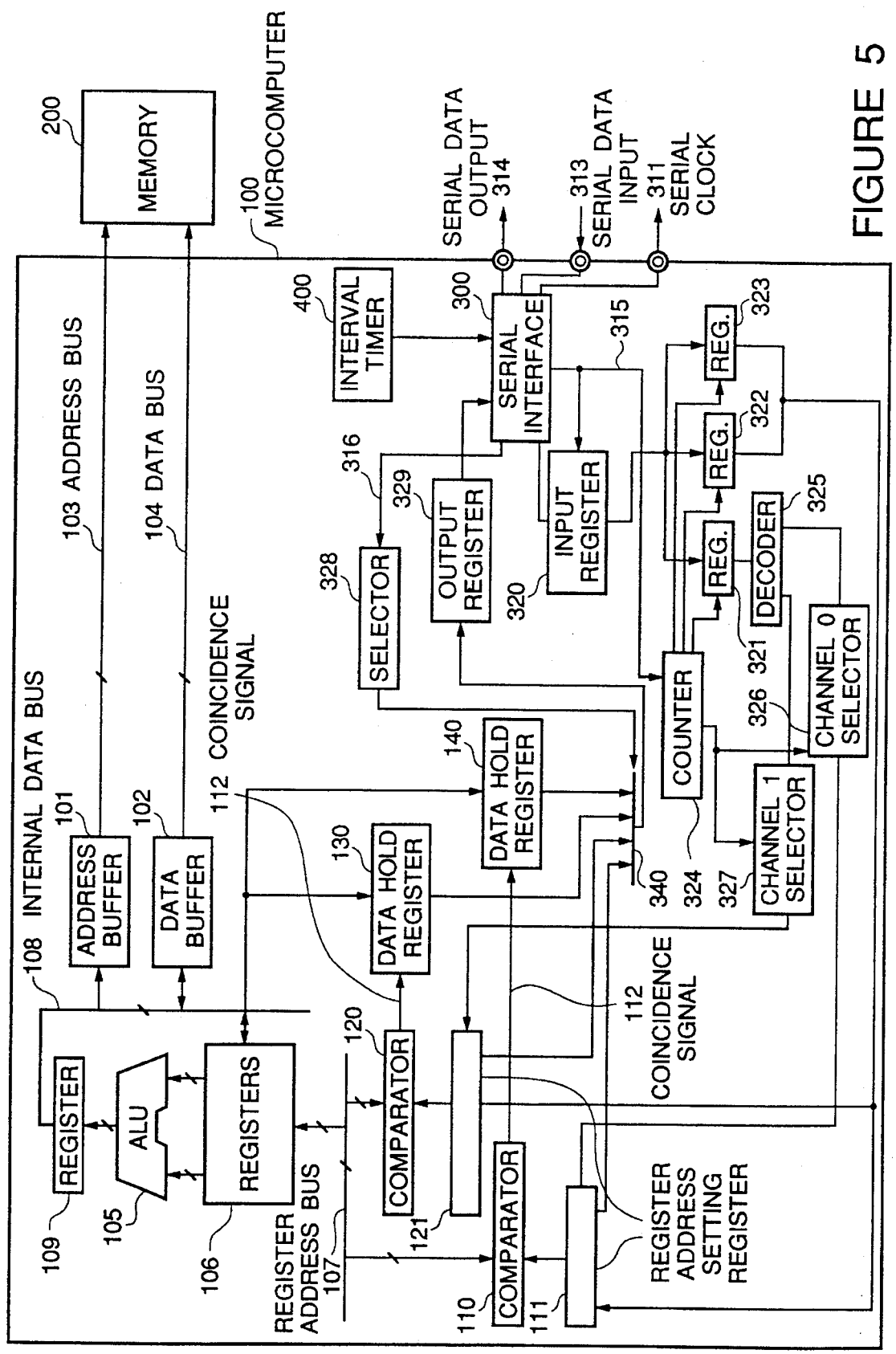
FIG. 5 is a block diagram of a third embodiment of the microcomputer in accordance with the present invention.

Referring to FIG. 5, there is shown a block diagram of a third embodiment of the microcomputer in accordance with the present invention. In FIG. 5, elements similar to those shown in FIG. 1 are given the same Reference Numerals, and explanation thereof will be omitted.

As will be seen from comparison between FIGS. 1 and 5, the third embodiment includes, in place of the serial bus 310 of the first embodiment, a serial data input line 313 and a serial data output line 314.

Figure 6:
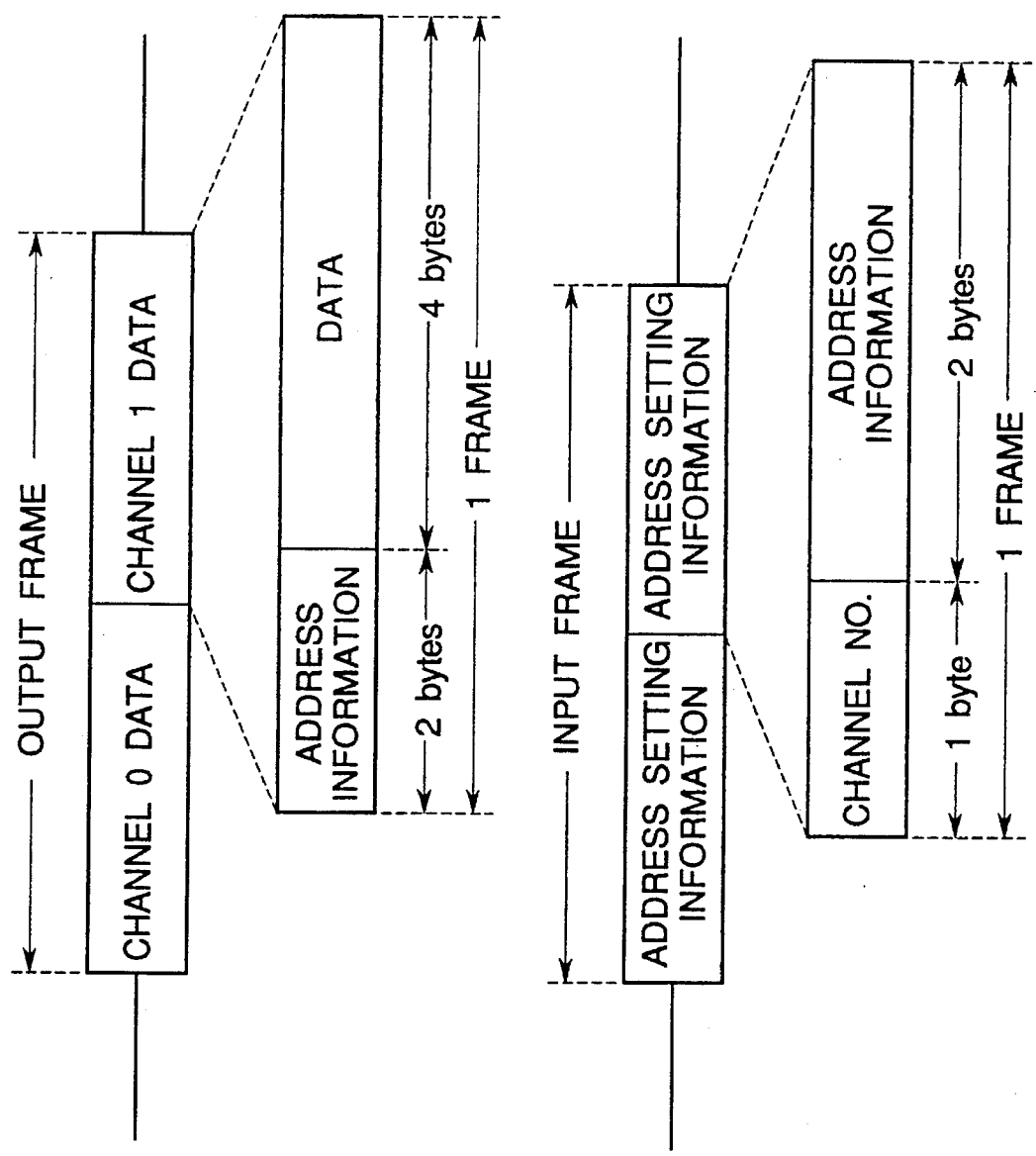
FIG. 6 illustrates a protocol of the serial interface in the third embodiment shown in FIG. 1.

The format of the input/output data is in the structure shown in FIG. 6. An input data is supplied from the serial data input line 313 to the serial interface 300. Each one frame of the input data is constituted of the channel number of one byte and the address information of two bytes. In the following, one frame of the input data is called the address setting information.

An output data is outputted from the serial data output line 314. Each one frame of the output data is composed of the address information of two bytes and the data of four bytes.

In the microcomputer 100 of the third embodiment, the serial interface 300 is configured to generate an address data input request signal 315 which is brought to "1" each time one type of data inputted as a portion of the address setting information from the serial data input line 313. The serial interface 300 also generates a serial data output request signal 316 which requests the output of the content of a register address setting registers 111 and 121 and the data hold registers 130 and 140.

The microcomputer 100 includes an input register 320 written with one byte of data from the serial interface 300 when an active address data input request signal 315 is generated, a channel number setting register 321 written with the one byte channel number of the input data from the input register 320, a MSB (most significant bit) address setting register 323 written with the MSB one byte address of the two byte address information of the input data from the input register 320, and a LSB (least significant bit) address setting register 323 written with the LSB one byte address of the two byte address information of the input data from the input register 320. Furthermore, the microcomputer 100 includes a counter 324 receiving and counting the active address data input request signal 315 for controlling the writing of the registers 321, 322 and 322, a decoder 325 connected to the channel number setting register 321 for decoding the channel number, a channel-0 selector 326 connected to the decoder 325 and the counter 324 for designating the writing of the address information to the register address setting register 111, and a channel-1 selector 327 connected to the decoder 325 and the counter 324 for designating the writing of the address information to the register address setting register 121. The microcomputer 100 also includes a selector 328 receiving the serial data output request signal 316 and controlling a multiplexor 340 which receives the output of the register address setting registers 111 and 121 of the two bytes and the data hold registers 130 and 140 of the four bytes, so as to cause the multiplexor 340 to select one byte of data, and an output register 329 having its input receiving the selected one byte from the multiplexor 340 and its output connected to the serial interface 300. The MSB address setting register 322 and the LSB address setting register 323 are combined to each other and coupled to the register address setting registers 111 and 121.

Similarly to the first embodiment, the serial interface 300 of the third embodiment is configured to receive a start request at predetermined intervals from the interval time 400, and to execute a data input/output operation of a series of serial data through the serial data input line 313 or the serial data output line 314 in synchronism with the serial clock 311.

Figure 7:
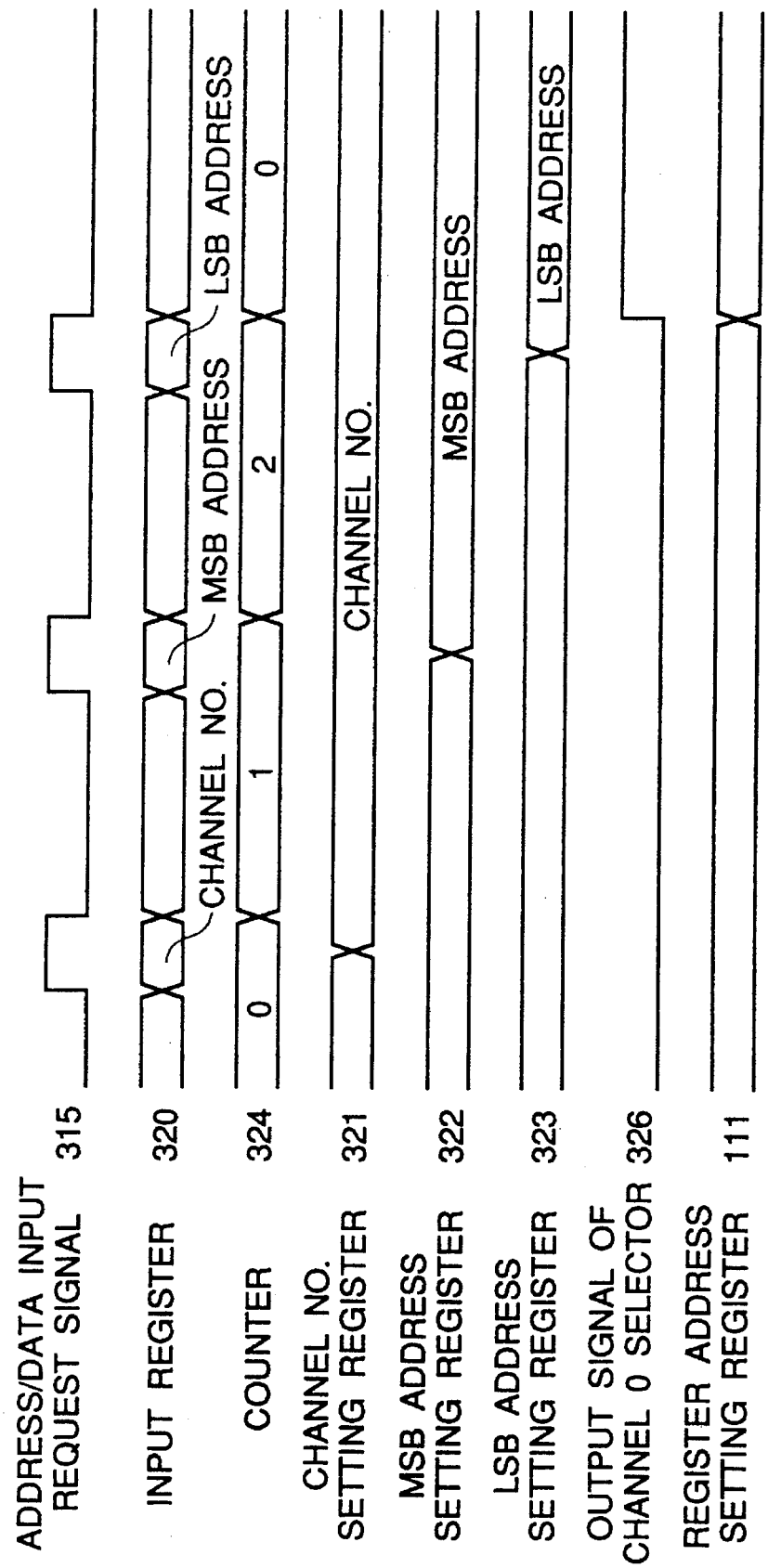
FIG. 7 is a timing chart illustrating the data input operation.

Now, the operation of the case in which the address setting information is supplied from the serial data input line 313 so that the address information is set into the register address setting register 111 for the "CHANNEL 0", will be explained with reference to FIG. 7 which is a timing chart illustrating the data input operation.

The serial interface 300 outputs "1" as the address data input request signal 315 each time one byte of the address setting information is received, and at the same time, outputs the received one byte data to the input register 320. The counter 324 which is in the initialized condition of "0", changes its content in the order of "0"→"1"→"2"→"0" each time the address data input request signal 315 is brought to "1". The content of the input register 320 is written to the channel number setting register 321 when the address data input request signal 315 is "1" and the value of the counter 324 is "0". Similarly, when the address data input request signal 315 is "1" and the value of the counter 324 is "1", the content of the input register 320 is written to the MSB address setting register 322, and when the address data input request signal 315 is "1" and the value of the counter 324 is "2", the content of the input register 320 is written to the LSB address setting register 323.

The channel number written into the channel number setting register 321 is converted by the decoder 325 to a signal supplied to the channel selectors 326 and 327.

If the channel number written into the channel number setting register 321 designates the "CHANNEL 0", the decoder 325 outputs the signal of "1" to the channel-0 selector 326 so as to designate the "CHANNEL 0". In this case, at the moment the content of the counter 324 changes from "2" to "0", the channel-0 selector 326 outputs a write signal to the register address setting register 111 so that the contents of the MSB address setting register 322 and the LSB address setting register 323 are written into the register address setting register 111

Similarly, if the channel number written into the channel number setting register 321 designates the "CHANNEL 1", the decoder 325 outputs the signal of "1" to the channel-1 selector 327. In this case, at the moment the content of the counter 324 changes from "2" to "0", the channel-1 selector 327 outputs a write signal to the register address setting register 121 so that the contents of the MSB address setting register 322 and the LSB address setting register 323 are written into the register address setting register 121

The fetching of the register data into the data hold registers 130 and 140 in the course of the operation of the microcomputer 100 is the same as that of the first embodiment, therefore, explanation thereof will be omitted.

Figure 8:
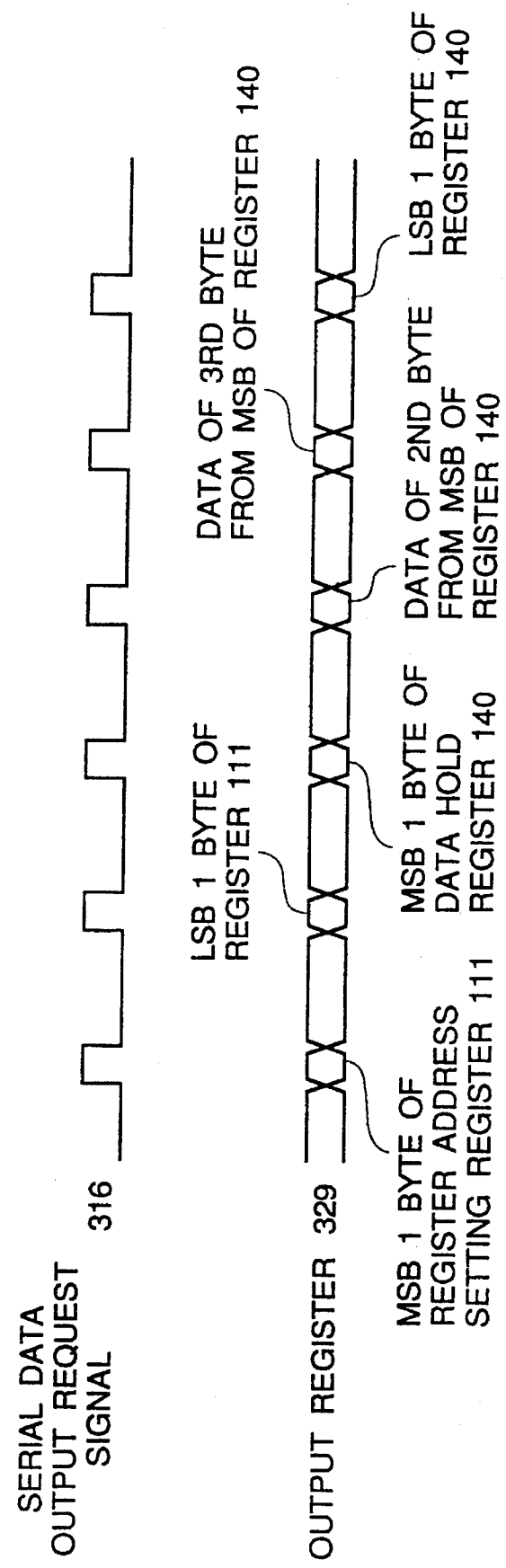
FIG. 8 is a timing chart illustrating the data output operation.

When the serial interface 300 is started to operate in response to the signal from the interval timer 400, the serial interface 300 outputs the serial data output request signal 316. The selector 328 controls the multiplexor 340 in such a manner that each time the serial data output request signal 316 of "1" is received from the serial interface 300, the data is read out in units of one byte in the order from the register address address setting register 111, the data hold register 140, the register address address setting register 121, and the data hold register 130, so that the read-out data is written into the output register 329, as shown in the timing chart of FIG. 8.

In addition, each time the serial data output request signal 316 is brought to "1", the serial interface 300 reads out one byte of data from the output register 329, and outputs the data through the serial data output line 314 to the external of the microcomputer 100 in synchronism with the serial clock 311.

Thus, the address information and the data are outputted to the external of the microcomputer 100.

In the above embodiments, the register address is composed of two bytes, and the data is constituted of four bytes. However, the register address and the data can be formed of different number of bytes by a simple modification of the hardware.

As seen from the above, in the microcomputer in accordance with the present invention, a register address setting register is previously written with a register address from an external of the microcomputer. When the address set in the register address setting register becomes coincident with a register address outputted on an internal register address bus, data on an internal data bus is fetched to a holding register. A content of the holding register is outputted through a serial interface to the external of the microcomputer. Therefore, it is possible to obtain information of an internal resource confined in the inside of the microcomputer, without disturbing the operation of the microcomputer.

Therefore, in such an application in which a machine is controlled by use of the microcomputer, it is possible to obtain information of an internal resource confined in the inside of the microcomputer, without stopping the execution of the microcomputer even temporarily. Therefore, there is no fear that the machine runs away or is broken down. In addition, since the instruction execution of the microcomputer is not stopped, it is possible to develop the program under the same actual time condition as the microcomputer is operated under the actual application.

The invention has thus been shown and described with reference to the specific embodiments. However, it should be noted that the present invention is in no way limited to the details of the illustrated structures but changes and modifications may be made within the scope of the appended claims.

We claim:

1. A microcomputer which includes a central processing unit having central processing unit output means including data buffer means connected to said central processing unit and to an external data bus, and a plurality of registers all of which are integrated on a single semiconductor substrate, the microcomputer comprising:

at least one holding means, separate and independent on said data buffer means, provided for internal resources whose content is not otherwise outputted to an external of the microcomputer, said at least one holding means operating to fetch the content of a predetermined internal resource at a predetermined timing, output means distinct from said central processing unit output means for outputting the content of said at least one holding means to the external of the microcomputer at another predetermined timing;

whereby the content of said at least one holding means is outputted through said output means to the external of the microcomputer without disturbing the execution of an inherent operation of the microcomputer and without being delayed by the central processing unit.

2. A microcomputer claimed in claim 1 wherein said at least one holding means includes a plurality of holding means, and further including a means for discriminating said plurality of holding means.

3. A microcomputer claimed in claim 1 wherein said output means includes a serial interface.

4. A microcomputer claimed in claim 1 further including an internal address bus and an internal data bus both coupled to said plurality of registers, wherein said internal resources include at least one internal register, and said microcomputer further including at least one register address setting means previously set with a first address of said at least one internal register, and at least one comparator for comparing said first address set in said at least one register address setting means with a second address outputted to said internal address bus of the microcomputer for accessing said at least one internal register, said at least one holding means fetching data from said internal data bus of the microcomputer in response to a coincidence output of said at least one comparator.

5. A microcomputer claimed in claim 4 wherein said output means includes a serial interface.

6. A microcomputer claimed in claim 4 wherein after a predetermined number of contents of said at least one holding means are outputted through said serial interface to the external of the microcomputer, said serial interface is switched into an input mode, and data for discriminating said internal resources is inputted to the microcomputer through said serial interface from the external of the microcomputer.

7. A microcomputer claimed in claim 3 wherein after a predetermined number of contents of said at least one holding means are outputted through said serial interface to the external of the microcomputer, said serial interface is switched into an input mode, and a register address to be sent to said register address setting means is inputted to the microcomputer through said serial interface from the external of the microcomputer.

8. A microcomputer, comprising:

a central processing unit, internal resources, and external resources;

said central processing unit, said internal resources and said external resources being integrated on a single semiconductor substrate, said central processing unit having central processing unit output means including data buffer means connected to said central processing unit and an external data bus, holding means, separate and independent of said data buffer means, for fetching and holding register information of said internal resources; and outputting means for outputting said register information from said holding means to said external resources, wherein said internal resources include means for outputting said register information only internally within said microcomputer, and wherein said outputting means is independent from said central processing unit such that said outputting means and said central processing unit have not interference with each other.

9. A microcomputer as claimed in claim 8 further comprising:

input/output means for transferring said register information between said outputting means and said external resources;

a register address setting register coupled to said input/output means for receiving address setting information from said external resources; and a comparator for comparing said address setting information with said register information, wherein, when said address setting information coincides with said register information, said comparator outputs said register information to said holding means.

10. A microprocessor as claimed in claim 9 further comprising:

a plurality of holding means;

a plurality of outputting means;

at least one interface for transferring information between said outputting means and said external resources; and at least one channel comprising a holding means of said plurality of said holding means and an outputting means of said plurality of said outputting means.

11. A microprocessor as claimed in claim 10 further comprising a channel selector coupled to said at least one interface and each of said at least one channel.

12. A microprocessor as claimed in claim 11 further comprising a register address bus and an internal data bus coupled to said registers, wherein said register information includes a register address and register data and wherein said comparator compares said register address from said register bus with said address setting information, wherein, when said address setting information coincides with said register address said comparator outputs a coincidence signal and when said coincidence signal is present, said register data is transferred from said internal data bus to said holding means; and said register data is transferred from said holding means to said external resources.

13. A microprocessor as claimed in claim 12 wherein said internal resources further comprise a plurality of registers and wherein said register information includes one frame of data;

said one frame of data including input mode information and output mode information and said input mode information including address setting information, wherein said output mode information including register data from said plurality of registers and wherein said input mode information further comprises a channel designation and a register address, and wherein said output mode information segregates said register data by channel.

14. A microcomputer as claimed in claim 13 further comprising a timer for outputting a start request, wherein, when said timer outputs a start request, said one frame of data is transferred between said outputting means and said external resources.

15. A microprocessor as claimed in claim 12 further comprising:

an input port coupled to said interface and at least one start flipflop coupled to said interface, wherein said interface is controlled by said at least one start flipflop to operate in an output mode and wherein said interface is controlled by said input port to operate in an input mode.

16. A microprocessor as claimed in claim 12, further comprising:

a selector coupled to said interface and a counter coupled to said interface, wherein said interface outputs a data output request signal to said selector for outputting said register information from said holding means to said external resources, and wherein said interface outputs an address data input request signal to said counter for inputting address setting information from said external resources to said register address setting register.

17. A microprocessor as claimed in claim 16, wherein said address setting information includes one unit of channel information and two units of register address information, and wherein said register information includes two units of register address information and four units of register data.

18. A microprocessor as claimed in claim 16 further comprising an input register coupled to said interface, a plurality of secondary registers coupled to said input register and a counter coupled to said interface, wherein said plurality of secondary registers hold said channel designation, a first bit data and a second bit data.

19. A microprocessor as claimed in claim 12 wherein said internal resources include one of random access memories, read only memories and peripherals.

20. A microprocessor as claimed in claim 12 wherein said interface is one of a parallel interface and a serial interface.

21. A microprocessor as claimed in claim 15, further comprising:

a selector coupled to said interface and a counter coupled to said interface, wherein said interface outputs a data output request signal to said selector for outputting said register information from said holding means to said external resources, and wherein said interface outputs an address data input request signal to said counter for inputting address setting information from said external resources to said register address setting register.

22. A microcomputer comprising:

a plurality of storage areas, each said storage area for temporarily storing operand data;

execution means, operatively connected to said storage area, for executing a string of instructions, wherein said string of instructions includes instructions for accessing said storage areas, performing an operation on said operand data and writing operation resultant data back to at least one of said storage areas;

a register operatively connected to said execution means;

means, operatively connected to said register, for writing storage area designation data to said register while said execution means is executing said string of instructions;

means, responsive to said storage area designation data stored in said register, for producing a detection signal when said execution means is accessing a storage area of said storage areas corresponding to said storage area designation data;

means, responsive to said detection signal, for temporarily latching said operation resultant data when said detection signal producing means produces said detection signal; and means, operatively connected to said latching means, for outputting said operation resultant data, wherein said outputting means includes means, independent from said execution means, for preventing said outputting means from interfering with said execution means and for preventing said execution means from interfering with said outputting means.

23. A microcomputer as in claim 22, wherein said storage area designation data comprises an area address and wherein said detection signal producing means comprises means for comparing said area address with an address to be accessed to said storage area, said detection signal producing means outputting said detection signal when said area address and said address to be accessed coincide.

24. A microcomputer as in claim 22, wherein at least one of said writing means and said detection signal producing means comprises a serial interface unit.

* * * * *